(12) United States Patent
Stanford et al.

(10) Patent No.: US 11,948,354 B2
(45) Date of Patent: Apr. 2, 2024

(54) AUTOMATED SPECTRAL SELECTION FOR FEATURE IDENTIFICATION FROM REMOTE SENSED IMAGES

(71) Applicant: Cultivate Agricultural Intelligence, LLC, Orlando, FL (US)

(72) Inventors: Jill Marie Stanford, Cumming, IA (US); Jeff Germain, Marble, CO (US); Jeremy Folds, Colorado Springs, CO (US); Bob Binckes, Fort Collins, CO (US)

(73) Assignee: Cultivate Agricultural Intelligence, LLC, Orlando, FL (US)

( * ) Notice: Subject to any disclaimer, the term of this patent is extended or adjusted under 35 U.S.C. 154(b) by 138 days.

(21) Appl. No.: 17/333,960

(22) Filed: May 28, 2021

(65) Prior Publication Data

US 2022/0092873 A1     Mar. 24, 2022

Related U.S. Application Data

(60) Provisional application No. 62/704,780, filed on May 28, 2020.

(51) Int. Cl.
*G06V 20/58*     (2022.01)
*G06V 10/58*     (2022.01)
(Continued)

(52) U.S. Cl.
CPC ............ *G06V 20/188* (2022.01); *G06V 10/58* (2022.01); *G06V 20/194* (2022.01); *H04W 4/029* (2018.02)

(58) Field of Classification Search
CPC .... G06V 20/188; G06V 20/194; G06V 10/58; G06V 20/10; G06V 20/13; G06V 10/40;
(Continued)

(56) References Cited

U.S. PATENT DOCUMENTS

2017/0308750 A1\* 10/2017 Shriver ................ G01N 33/025
2022/0130036 A1\*  4/2022 Gatto ........................ G06T 7/70

FOREIGN PATENT DOCUMENTS

WO    WO-2019122271 A1 \*  6/2019  ............... G06K 9/62

OTHER PUBLICATIONS

Pelz et al. "Monitoring forest cover spatial patterns with aerial imagery: A tutorial." Technical Brief CFRI-TB-1401, Colorado Forest Restoration Institute, Colorado State University, Fort Collins, Colorado (2014) (Year: 2014).\*

(Continued)

*Primary Examiner* — Gandhi Thirugnanam
*Assistant Examiner* — Michael Adam Shariff
(74) *Attorney, Agent, or Firm* — Brick Gentry P.C.; Brian J. Laurenzo (57) ABSTRACT

Disclosed are systems, methods, and apparatus related to automated spectral selection for feature identification from remote sensed images. The invention includes various modules, such as a spectral selection processing module and a user device module that are communicatively coupled to each other via a communication connection. The invention includes a non-transitory memory that causes a processor to carry out one or more tasks. Those tasks include, but are not limited to, storing imagery; generating a list of imagery, input related to the imagery, a map view, target pixel values, and geometry related to the imagery; transforming pixels to vectors; conducting analytics within the identified vector features; quantifying data within identified vector features; and displaying the results on the user device module.

14 Claims, 11 Drawing Sheets

(51) Int. Cl.
*G06V 20/10* (2022.01)
*H04W 4/029* (2018.01)

(58) Field of Classification Search
CPC ........ G06V 10/56; G06V 10/70; G06V 10/82; G06V 30/18114; G06V 10/945; G06V 20/17; H04W 4/029; H04W 4/02; G06T 7/10; G06T 7/11; G06T 2207/10024; G06T 2207/10; G06T 2207/10032; G06T 2207/20081; G06T 17/05; G06T 2200/00; G06T 2200/16; G06T 2207/10036; G06T 2200/24; G06T 2207/20104; G06T 2207/20092; G06T 2207/30181; G06T 2207/30188; G06Q 10/06; G06Q 10/063; G06Q 10/0637; G06Q 50/02; G06N 7/005; G06F 18/00; G06K 9/0063; G06K 9/00657

See application file for complete search history.

(56) References Cited

OTHER PUBLICATIONS

International Preliminary Report on Patentability, Written Opinion of the International Search Authority for PCT Application No. PCT/US2021/034901, Filed May 28, 2021.

* cited by examiner

AUTOMATED SPECTRAL SELECTION FOR FEATURE IDENTIFICATION FROM REMOTE SENSED IMAGES

CROSS REFERENCE TO RELATED APPLICATIONS

This application claims priority from U.S. Provisional Patent Application No. 62/704,780 filed May 28, 2020 and entitled AUTOMATED SPECTRAL SELECTION FOR FEATURE IDENTIFICATION FROM REMOTE SENSED IMAGES. The entire contents of U.S. Provisional Patent Application No. 62/704,780 are hereby incorporated by reference.

FIELD OF INVENTION

The present invention relates to the field of Remote Sensing and Geographic Information System (GIS) software. Specifically, the present invention relates to software developed to identify spectral patterns in remotely sensed raster imagery, transform these patterns into vector feature (s) of interest and then quantify the identified feature(s). Applications of this invention include, but are not limited to, the field of Precision Agriculture where current software does not exist to allow a user to seamlessly retrieve quantitative information from consumer drone, aerial, satellite or other imagery and therefore requires the user to rely on visual and qualitative interpretations of spatial patterns in the imagery.

BACKGROUND OF THE INVENTION

In the past five to ten years, remotely sensed satellite imagery has become readily available to the general public. Moreover, in recent years, many consumers in the general public have acquired a personal recreational or commercial grade drone capable of capturing high resolution imagery. Cameras mounted on these remote sensing systems are often capable of capturing not only the traditional Red, Green, Blue (RGB) color photo of the past, but now can also provide imagery output with spectral bands that are not visible to the human eye. The RGB visible bands' wavelengths range from approximately 0.4-0.7 µm in the electromagnetic spectrum. Many of the remote sensing systems offer cameras able to capture imagery in the electromagnetic spectrum invisible to the human eye including the infrared (IR) region with wavelengths ranging from approximately 0.7-100 µm. Sensors capturing invisible bands enable detection of specific vegetation indicators. For example, indices for chlorophyll content detection in vegetation can be determined with the Near Infrared (NIR) wavelengths around 760-900 nm and chlorophyll absorption can be determined with RedEdge (RE) wavelengths around 700-730 nm.

While these remotely sensed images are useful for generating a map for the human eye to visualize features from an aerial perspective, there is a consumer challenge in transforming these images into valuable, quantifiable information. Often, the overwhelming amount of imagery requires unreasonable processing and provides little to no value beyond a human visual interpretation and view of patterns on a map. Agronomists, farmers, crop insurance agents, researchers, and others are left to estimate areas of concern from imagery by visually estimating, walking, or driving around an area, then estimating the impact. (Ex: Wind damaged corn covered approximately 10 acres of the field, reducing yield 10%).

Therefore, a need exists in the field for software to transform spectral signatures in remotely sensed imagery and provide automated selection, extraction, and/or quantification of features of interest into a more accurate area, distance, count, or other statistical summary on a given issue of concern than is possible using the visual methods of the prior art. (Ex: Wind damaged corn covered 17.25 acres of the field reducing yield in the identified area to 89.5 bushels/acre).

BRIEF SUMMARY OF INVENTION

Provided are embodiments of an automated spectral selection for feature identification from remote sensed images. Embodiments of the invention provide the ability to automatically detect, identify, transform, and/or quantify special patterns in imagery. Systems, apparatuses, and methods are disclosed.

In one embodiment, a system for spectral selection is provided comprising a spectral selection processing module and a user device module which are communicatively coupled to each other via a communication connection. The spectral selection processing module includes at least one processor and stores one or more pieces of imagery. The one or more pieces of imagery are raster formatted images having at least one image band. The user device module and at least one processor are configured to communicate with each other and at least one non-transitory memory with one or more executable instructions stored thereon. The processor is configured to execute the one or more executable instructions. The one or more executable instructions are configured to cause the processor to perform several tasks.

The tasks include storing at least one of said one or more pieces of imagery and generating a list of said one or more pieces of imagery viewable on said user device module. At least one input related to said one or more pieces of imagery for user selection is also generated. In addition, a map view of said one or more pieces of imagery is generated on said user device module wherein a user may input at least one extent of said one or more pieces of imagery for analysis by said spectral selection processing module. Also generated are target pixel values based on the at least one extent. The pixels are transferred to vectors and geometry corresponding to the at least one extent is generated. Results are displayed on the user device module.

The instructions may also be configured to cause the processor to quantify at least one parameter in the one or more pieces of imagery. In some embodiments, the instructions may be configured to cause the processor to quantify spatial patterns in one or more pieces of imagery. The system may further comprise at least one other source of said one or more pieces of imagery. Moreover, in some embodiments, the instructions are also configured to cause the processor to smooth the vectors. The user device module input may activate the process or carry out one or more of its instructions. The system may also include a machine learning module, which may be located within said spectral selection processing module. The user device module may allow a user to input a location, which may be tied to a GPS module that may be part of the user device module. The instructions may also be configured to allow the user device module to verify the results. This verification may be communicated to the machine learning module.

In another embodiment of the invention, a system for spectral selection is provided comprising a spectral selection processing module, a user device module, a GPS module, and at least one other source of one or more pieces of imagery. The spectral selection processing module and user device module communicatively coupled to each other via a communication connection. The spectral selection processing module includes at least one processor and stores one or more pieces of imagery. The one or more pieces of imagery are raster formatted images having at least one image band. The user device module and at least one processor are configured to communicate with each other and at least one non-transitory memory with one or more executable instructions stored thereon. The processor is configured to execute the one or more executable instructions. The one or more executable instructions are configured to cause the processor to perform several tasks.

The tasks include storing at least one of said one or more pieces of imagery and generating a list of said one or more pieces of imagery viewable on said user device module. At least one input related to said one or more pieces of imagery for user selection is also generated. In addition, a map view of said one or more pieces of imagery is generated on said user device module wherein a user may input at least one extent of said one or more pieces of imagery for analysis by said spectral selection processing module. Also generated are target pixel values based on the at least one extent. The pixels are transferred to vectors and geometry corresponding to the at least one extent is generated. Spatial patterns in the one or more pieces of imagery are quantified. Results are displayed on the user device module.

DETAILED DESCRIPTION

Described are systems and methods for automated spectral selection for feature identification from remote sensed images. The present invention seeks to provide novel software and/or hardware to a growing number of drone owners and/or consumers of commercially available imagery to obtain value out of the imagery by providing the ability to automatically analyze the imagery, such as to automatically detect, identify, transform, and/or quantify spatial patterns in the imagery. The software processes in the present invention utilize novel user input(s), mathematical technique(s) and spatial operation(s) to enable the transformation of spectral signatures in remotely sensed imagery into features with spectral similarities. Examples of such spatial patterns may relate to vegetation health such as vegetation stress, damage, pest infestation, excessive water, and/or plant identification for inventory count. The invention allows users such as agronomists, crop insurance agents, researchers, and others the ability to extract and quantify features of interest into an exact area, distance or count on a given issue of concern. (Ex: Wind damaged corn covered 17.25 acres of the field).

Figure 1:
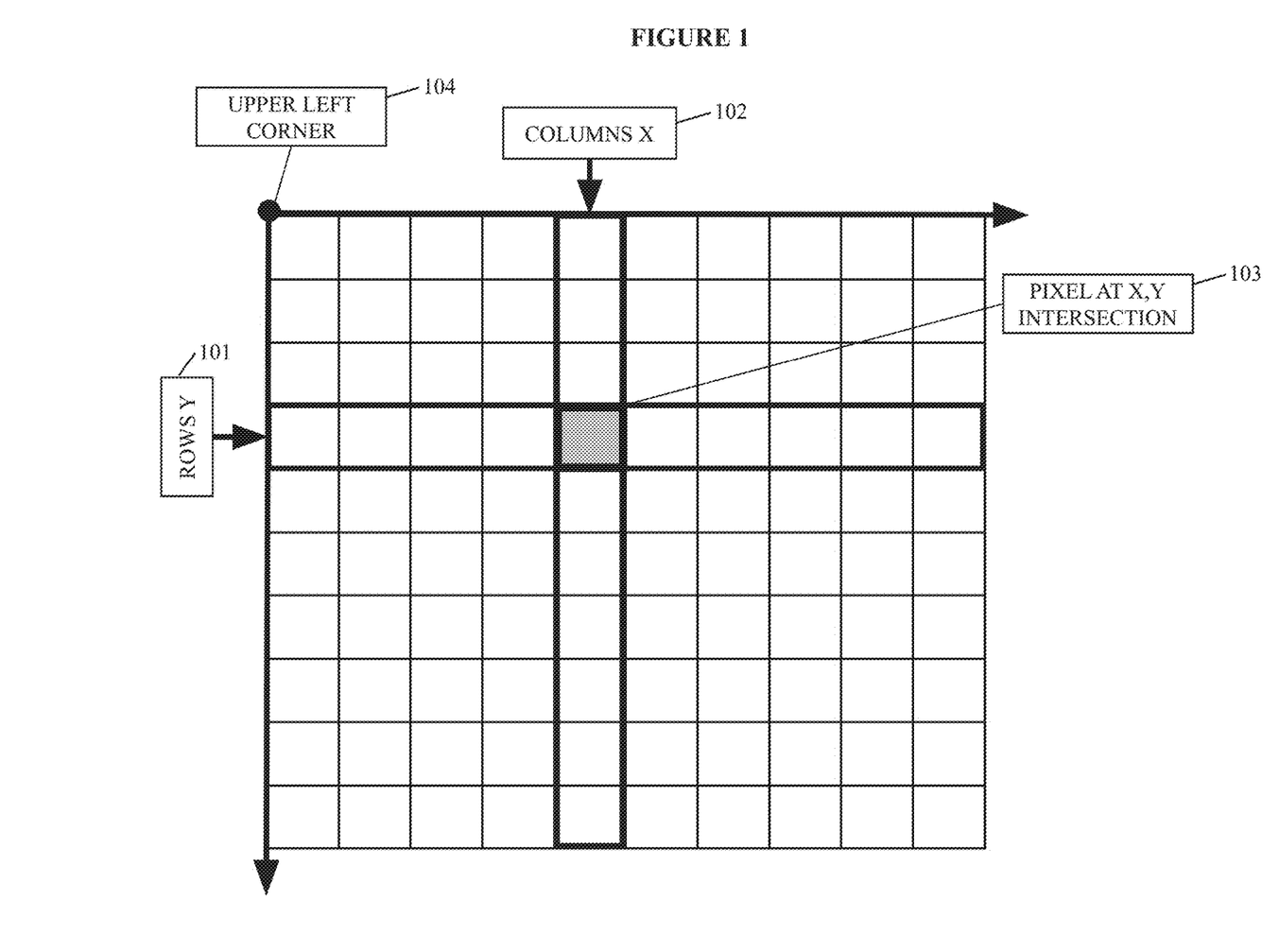
FIG. 1 is a simplified diagram of one example of a raster formatted image that consists of a collection of uniformly sized pixels arranged in a grid of columns and rows.
Figure 2:
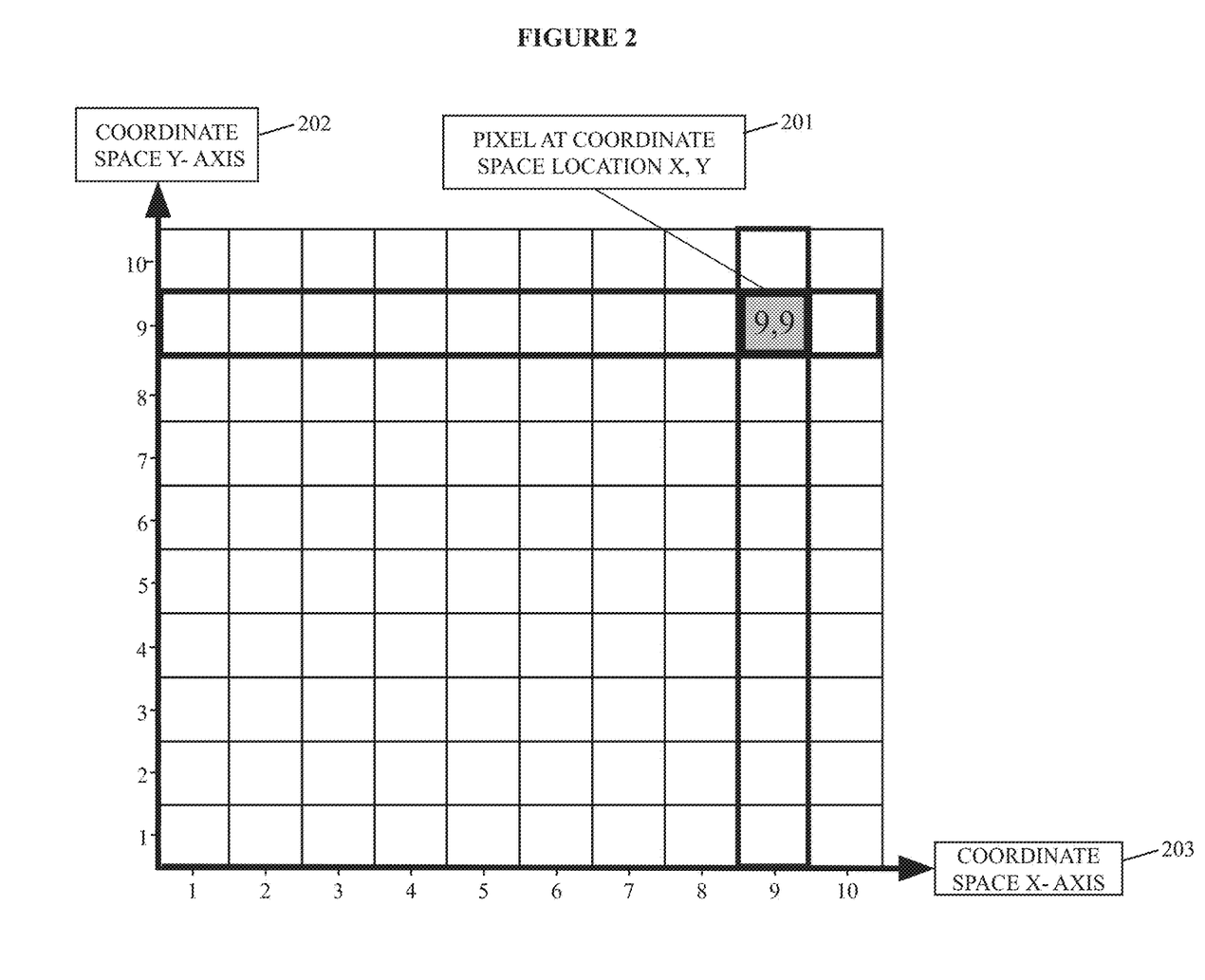
FIG. 2 is a simplified diagram of one example of a georeferenced raster image.

The software described in the present invention can utilize input from a raster formatted file, user input spatial location, and/or context information. FIG. 1 illustrates an example of a basic raster image that consists of a matrix of uniformly sized cells or pixels organized in a grid of rows 101 and columns 102 where every pixel 103 has a specific row and column location address originating from the upper-left corner of the image 104. FIG. 2 illustrates an example of the same raster image in FIG. 1, but georeferenced with spatial location information where each pixel cell is modeled to a real-world ground location within a defined coordinate space. This georeferencing establishes an x,y ground location for each pixel 201 where the rows of pixels 101 are parallel to the X-Axis of the coordinate plane 202 and the columns 102 are parallel to the Y-Axis of the coordinate plane 203. Based on this, each pixel can be described with a unique identifier. For example, the shaded pixel of FIG. 2 can be identified as 9,9 because it is located at the intersection of column 9 and row 9.

Figure 3A:
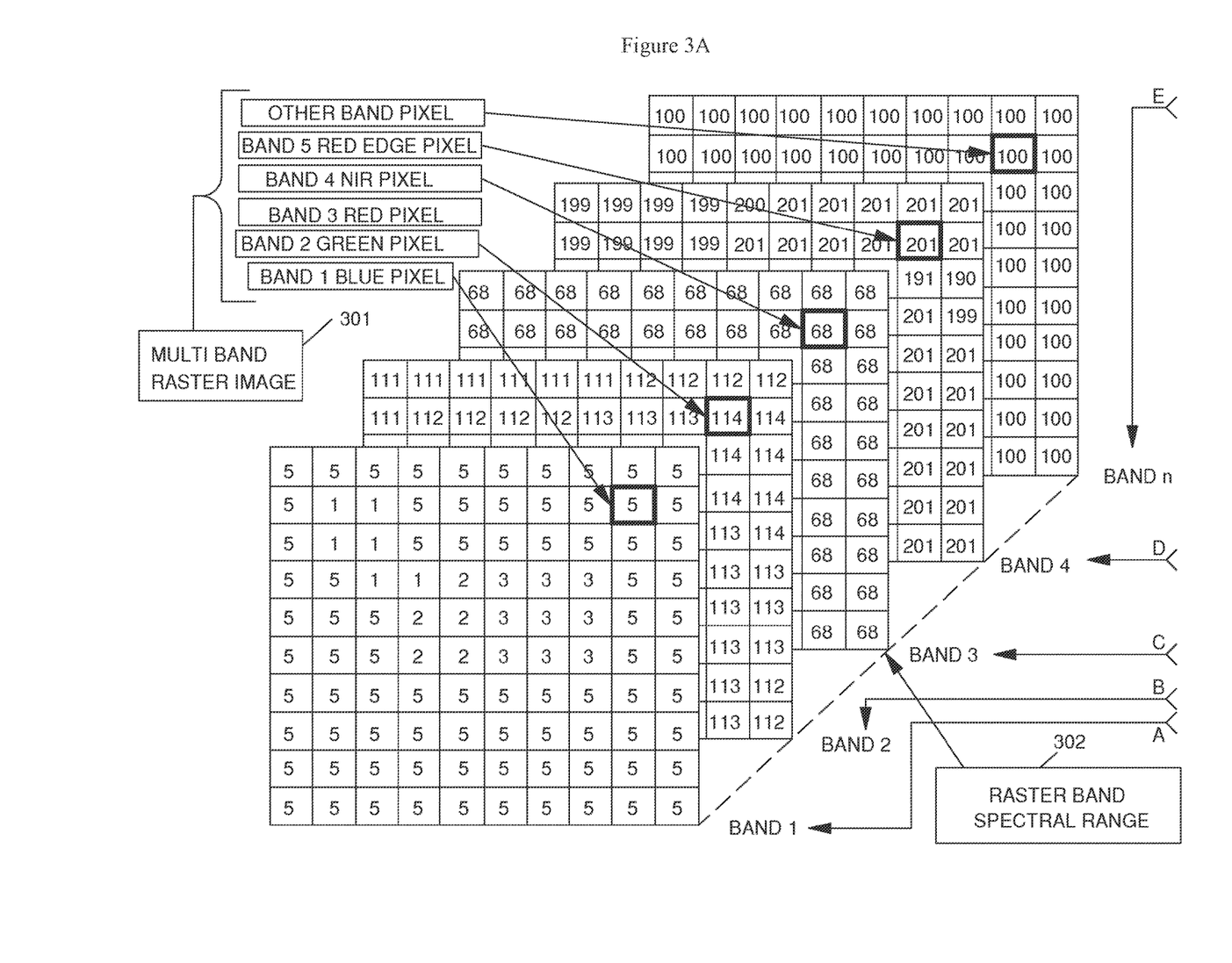
FIG. 3A is a partial view of a simplified diagram of one example of a raster image consisting of multiple image bands.
Figure 3B:
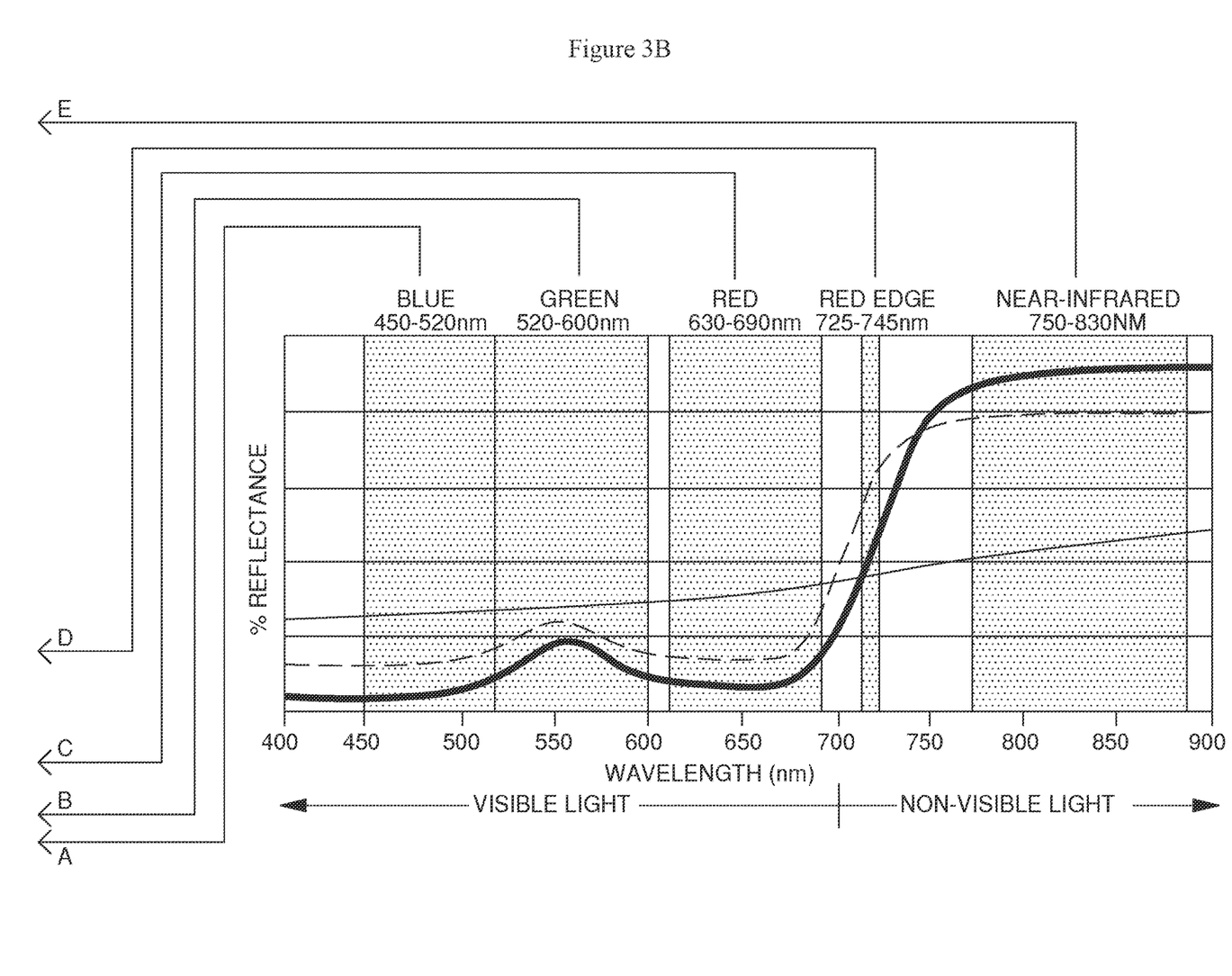
FIG. 3B is a partial view of a simplified diagram of one example of a raster image consisting of multiple image bands.

The raster images of FIGS. 1 and 2 can be further detailed. FIGS. 3A and 3B provide an example of digital image values or spectral signatures captured by a remote sensing sensor stored at each pixel location 301. A raster image may have one or more single raster bands where each band 302 relates to a range in the electromagnetic spectrum collected by the sensor. An example of a standard Red, Green, Blue (RGB) image can be represented in a composite image Band 1 (Blue), Band 2 (Green) and Band 3 (Red) in a multiband raster. The software described in the present invention can utilize input from one or more of single band, multi-band, multi date, and multiple composite image combinations in order to correlate unique spectral patterns to a given event, point location or area.

Figure 4:
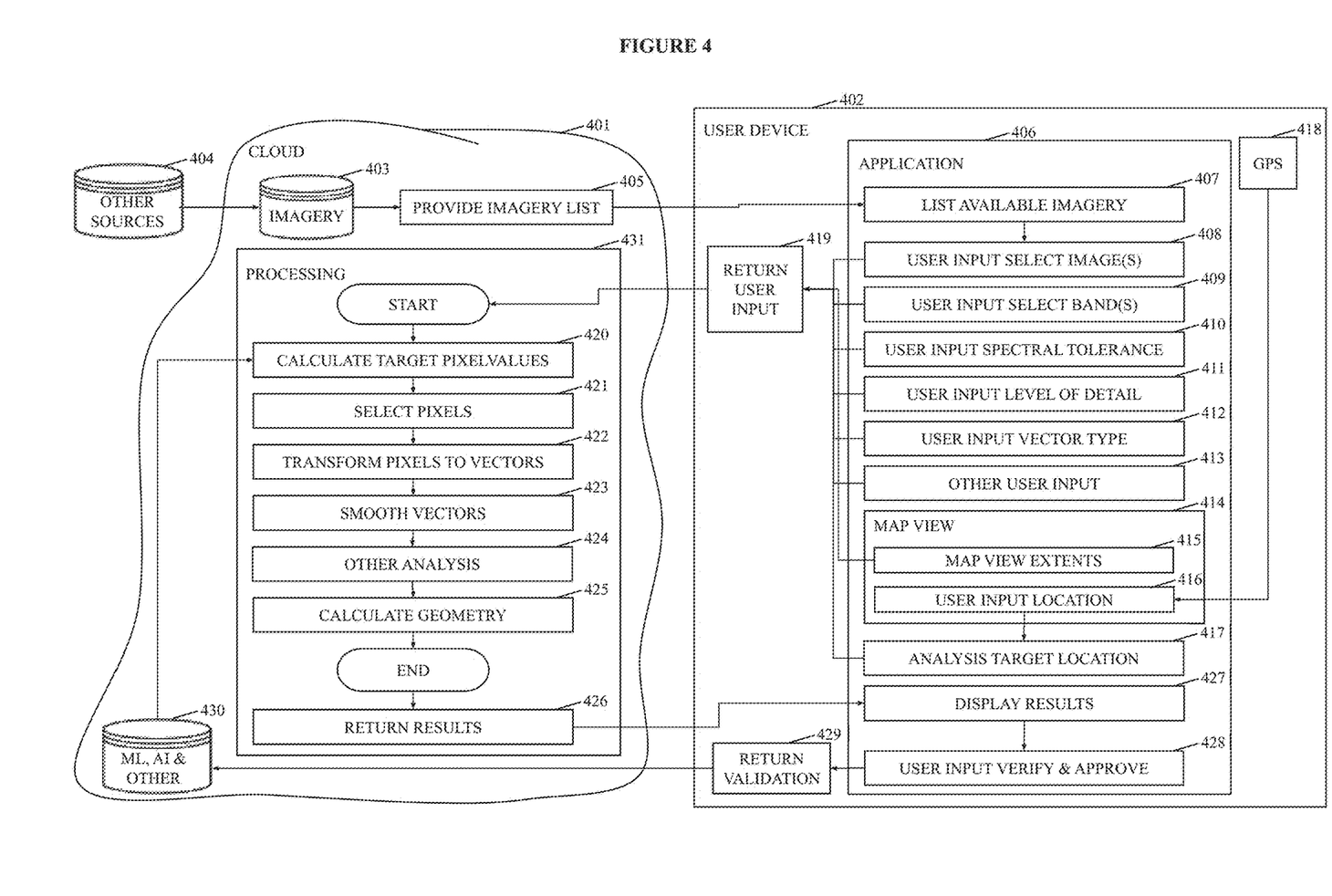
FIG. 4 shows one example of a computing environment where data workflow and calculations for identifying and quantifying features of interest could occur.

FIG. 4 illustrates an example of one embodiment of the data flow, software processing steps and software algorithms for automating spectral selection for feature identification and quantification. The software may include one or more modules. In the illustrated embodiment, four example modules are provided: (1) a spectral selection processing module 431, (2) a user device module 402, (3) one or more modules contributing other sources 404 of imagery; and (4) a GPS module 418. The software processing can optionally reside in a cloud location 401, user device 402 such as a laptop or mobile device, and/or other computing system. The flow chart in FIG. 4 represents one example of software processing workflow. In this scenario, the data originates in the cloud 401 with stored imagery 403 or other data accessed from an external source of data 404 and provides this list of imagery 405 to a software application 406 on a user device 402. The cloud location 401 or other computing system (such as a laptop, mobile device, or other) can carry out one or more of a number of functions using the stored imagery 403 and/or other source 404 material. As illustrated in this example, those functions may be activated or start via user input 419 that is returned to the spectral selection processing 431 system via a connection. In preferred embodiments such as the embodiment shown in FIG. 4, the spectral selection processing 431 system and the user device 402 are distinct devices that are in communication with each other via one or more connections. However, other configurations are possible without departing from the scope of the invention. Accordingly, such a connection may be any type of connection known in the art, such as through an intranet, the internet, or within the same device.

Based on the input in the user facing software application 406, the spectral selection processing 431 system may be activated to carry out one or more of the following: calculate target pixel values 420, select pixels 421, transform pixels to vectors 422, smooth vectors 423, other analysis 424, and calculate geometry 425. After the functions are complete, the processing may end, and the system will return the results 426 to the user application 406.

The user facing software application 406 may provide one or more user options in order to activate or complete the spectral selection processing 431.

The user facing application 406 may provide a list of available imagery 407 to the user for analysis. The user facing application 406 provides the user an option to select one or more target image sources as user input 408 from the list of available imagery 407 displayed in the application 406. Alternatively, an image source can be automatically selected to use in the spectral selection algorithm.

Based on the image(s) selected in 408 and the spectral band 301, the software may also allow further refinement of the analysis by allowing the user to select one or more imagery band(s) 409, combination of bands, or composite imagery 409 to be used in the spectral selection algorithm. The user selected image band(s) limits the spectral ranges included in the feature identification calculations. The user Input for Spectral Tolerance 410 is a percentage value ranging from 0-100 indicating the influence for including pixels of similar values in the calculation. The user input for Level of Detail 411 is an optional feature to adjust the level of precision in the resulting vector output. The lower the detail, the more general or smooth the resulting raster 506, while higher detail vectors will follow a more discrete pixel path and appear more jagged matching the selected cells in the raster image 507. The optional level of detail input 411 also may include input for a minimum area in order to remove gaps or small holes in the resulting vector. Optional user input 412 allows for the user to define the vector output type as point, line or polygon shapes. If no option is selected, the software may determine the optimal output type in preferred embodiments.

Other user input 413 can include, but is not limited to, other parameters or data sources available to the user that would improve the spectral selection algorithm and provide additional quantitative data analysis. Other data may include, but is not limited to, in-field observations, such as information entered by the user on a mobile phone in the field and IOT Sensor captured data, including but not limited to a soil moisture probe, thermal sensor, yield monitor, and/or pest monitor. Each of these example data inputs may have limitations and/or customizations to create other parameters that influence which data is used. For example, filters may be used for minimum and/or maximum values for any data. In one example, FIG. 9, which is discussed in detail below, provides a harvest or yield embodiment of the invention. The harvest data may be observed or captured in the field and/or from an IOT sensor 413 and is associated with the vector polygon 427, then may provide a quantitative interpolation of yield for the whole field.

An interactive Map View 414 may be displayed to the user in the application 406. The map view may allow map view extents 415 and for the user to input location 416. The application 406 may then activate the spectral selection processing system 431 to carry out its functions resulting in returned results 426. The user application 406 then displays the results 427. The user may then provide input to verify and approve the results 428. The approval activates a return validation function which is communicated to the spectral selection processing system 431. As shown in the flow chart of FIG. 4, many of the user application 406 functions may activate the spectral selection processing system 431 to return user input. Moreover, the user application 406 functions may work alone or in combination to activate the spectral selection processing system 431 to return user input. An additional aspect of the user application 406 may be a GPS 418 system located within the user device 402. The GPS 418 may provide information to the user input location 416 function of the user application 406.

Figure 5:
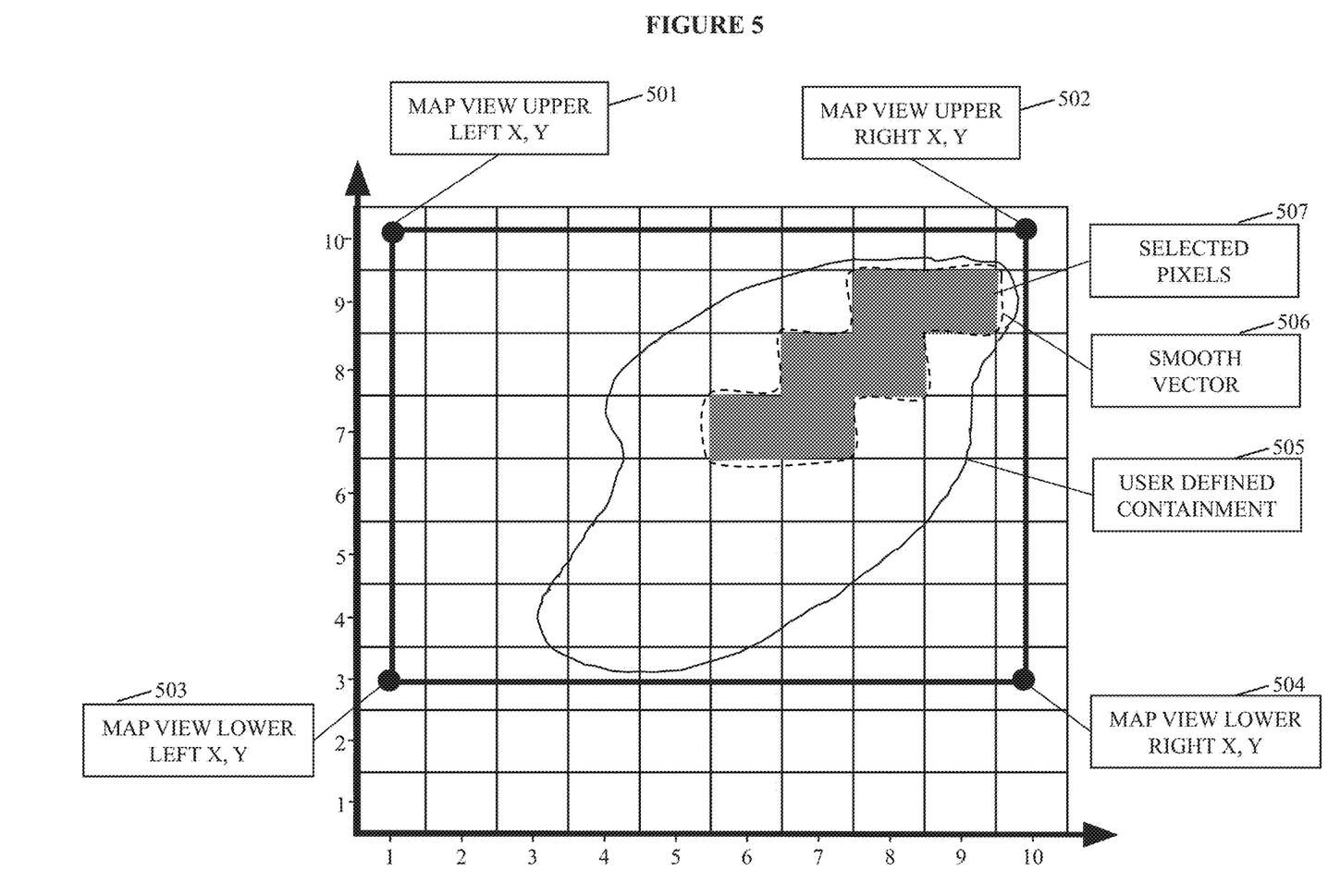
FIG. 5 shows one example of the spatial extents of a map view and a user defined containment area, selected pixels and a smooth vector within the map view.

As noted above, the user application 406 may provide a map view 404 to the user. FIG. 5 illustrates an example of a rectangular spatial area representing a map view 414 displayed within the user software application 406. The map view extent is defined by the location of the exterior upper left 501, upper right 502, lower left 503 and lower right 504 coordinates. As the user pans and zooms around the map view 414, the map view extents 415 update to match the corresponding coordinate space. The spectral selection process 431 requires a defined geographic area to determine where to conduct the calculations, so one option in the software application is to retrieve this area by utilizing the map view extents 415.

As noted above, one option of the spectral selection algorithm allows for input of an analysis target location 417 whereby the user requests analysis to be conducted for a user-defined location either captured from the GPS 418 location provided by the user device 402 or as defined by user interaction with the user input location 416 in the interactive map view by selecting a location within the map view 414. Whether using the GPS 418, user input location 416, or both, the selected pixels 507 create the image shown to the user, which draws upon the appropriate raster(s) and/or band(s). Within the user application 406, the user may create a user defined containment area 505 for analysis. Moreover, the user and/or the system may provide selected pixels 507 for analysis. Also shown in FIG. 5 is a smooth vector.

Figure 6:
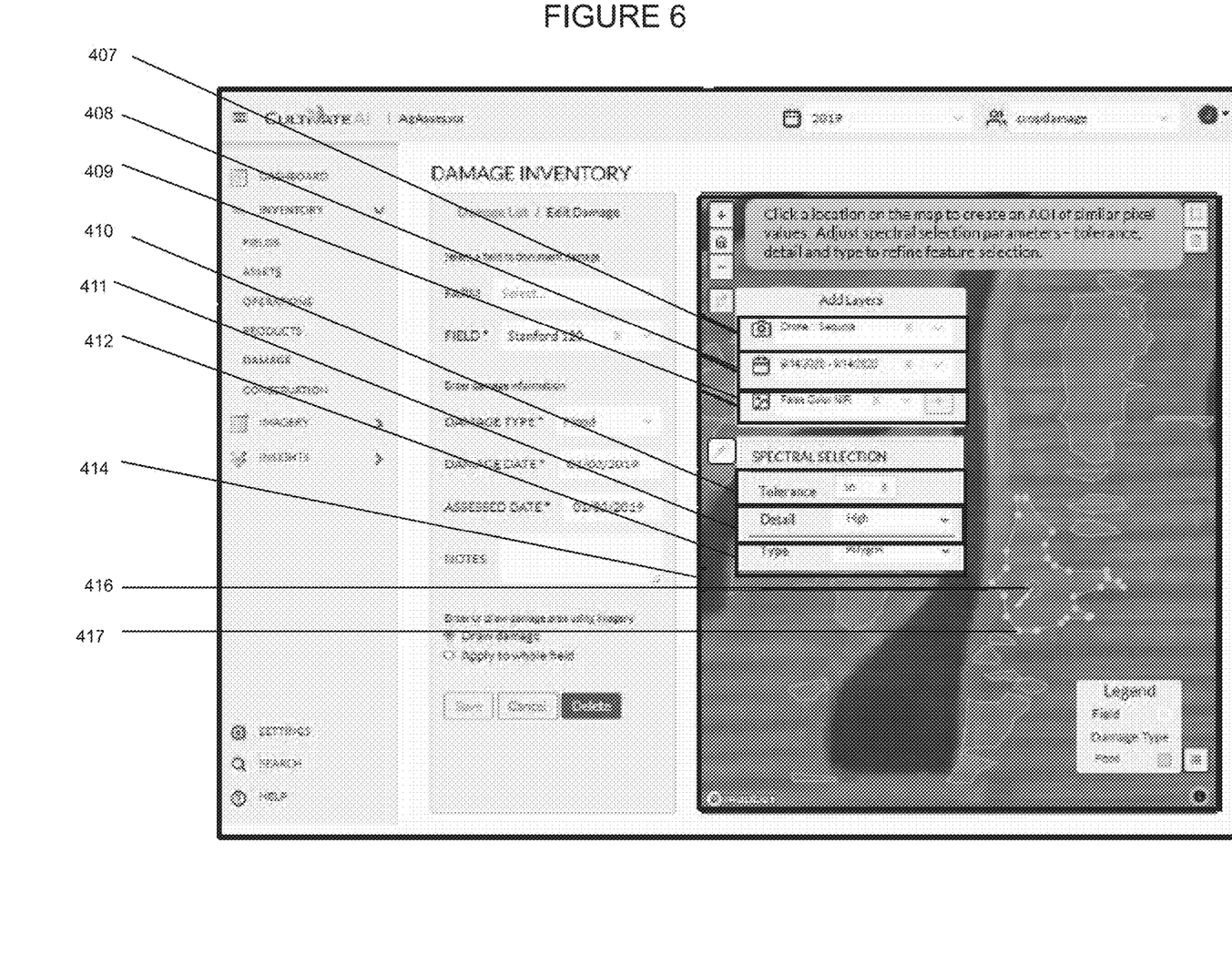
FIG. 6 shows an example of a software application user interface of the spectral selection algorithm workflow where the user clicks target analysis location on map.

FIG. 6 illustrates an example of a software application's user interface for automating Spectral Selection for Feature Identification from Remote Sensed Images. FIG. 6 focuses on the user interface but also includes a portion of the system described in FIG. 4 to show how the user interface relates to the described system. In this application 406, the user first selects the input imagery 408 and image bands 409 from a list of available imagery 407. Next, within the application map view 414, the user clicks a location on the map 416 with a spectral selection tool and adjusts spectral selection parameters spectral tolerance 410, level of detail 411, and vector type 412 as needed to refine the feature generation. These inputs combined provide an analysis target location 417 and are returned as user inputs 419 to activate the spectral selection processing system 431, which may be a server in some preferred embodiments, to carry out its processing functions. The resulting polygon is returned 426 to the software application 406 displayed 427 on the map view 414. After user validation 429, the polygon is stored for future analysis 430.

Figure 7:
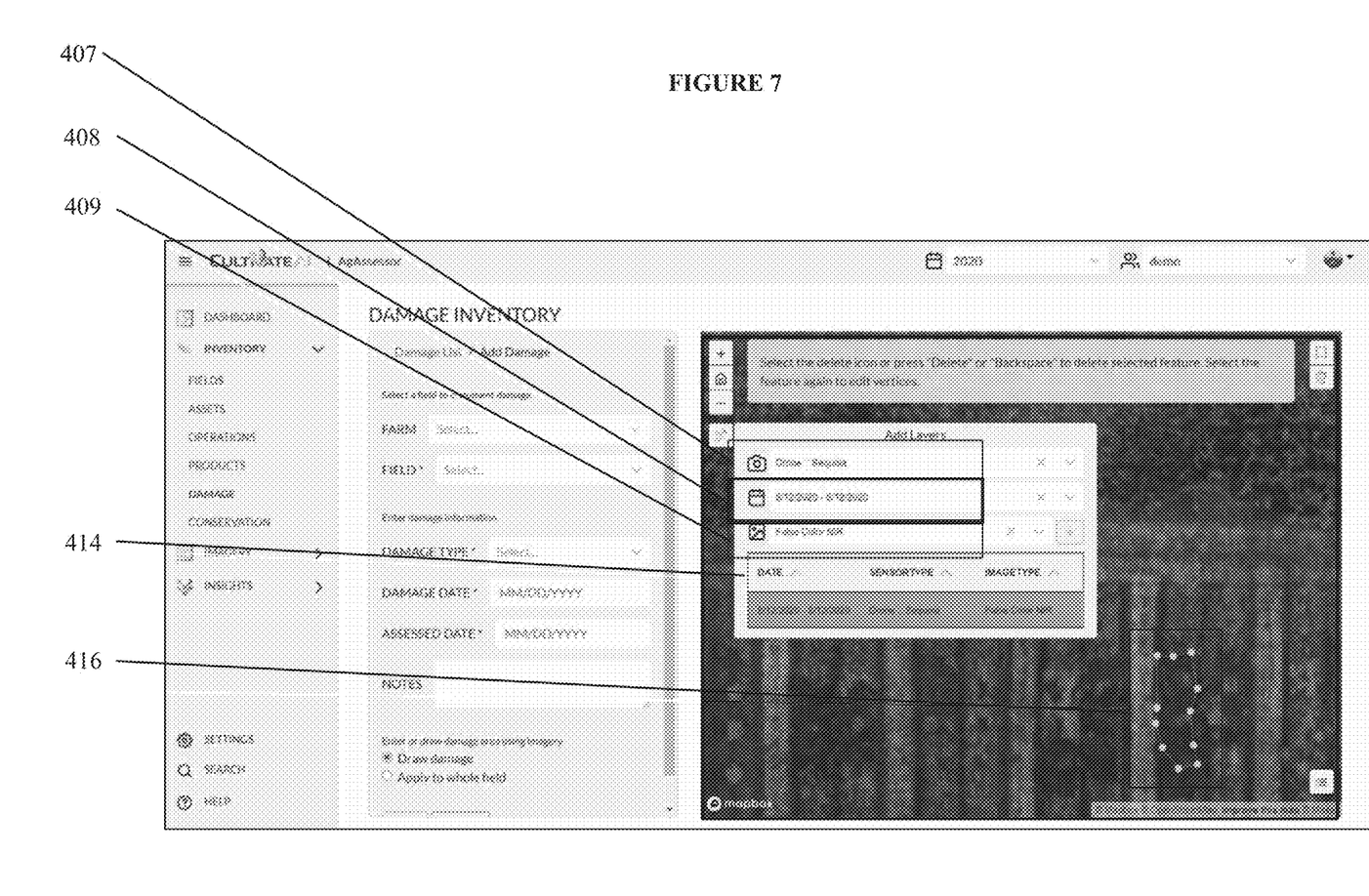
FIG. 7 shows an example of a software application user interface utilized for manually digitizing a vector polygon area on the map view from selected imagery.

In some embodiments, the user application 406 allows the user to manually draw the user-defined containment area 505. FIG. 7 illustrates an example of a software application's user interface for a user to manually draw polygons from imagery as an alternative to deriving the Analysis Target Location 417 through automated means. FIG. 7 focuses on the user interface but also includes a portion of the system described in FIG. 4 to show how the user interface relates to the described system. This application 406, provides the user with tools to manually digitize polygons on the map view 414 using selected imagery 408 and spectral band combinations 409 to provide a backdrop to inform the user input location 416 by drawing. When the user has completed drawing, it is displayed 427 in the application, verified and approved 428. After user validation 429, the polygon is stored for future analysis 430. This allows the user to select one or more portions of a larger image, such as an entire field, for analysis. Moreover, the Analysis Target Location 417 can be further refined by the user by identifying a bounding area to restrict analysis to occur only within the user defined containment area 505. Referring to FIG. 5, in this scenario, all pixels outside the polygon user defined containment area 505 are excluded from the processing. Alternatively, another option is to set the user defined containment area 505 to restrict analysis to only outside the user defined containment area 505. In this option, the analysis would only occur between the map view extents 415 and the user defined containment area 505.

As user input parameters are available, a collection of user input parameter(s) are sent from the user facing application for processing via the return user input 419 function. This collection of user input parameter(s) may include but is not limited to one or more user input parameters provided by the user in the application 406. Alternatively, such parameters may be provided automatically by the system.

As introduced above, and referring to FIGS. 4-7, the software processing begins after activation by the user application 406 through the return user input 419 function. The first step of the software processing may be calculating target pixel values 420. This may occur by first extracting the pixel values for the selected band(s) 409 at the defined analysis target location 417 for the pixel located at the given coordinate space location 201. This provides a discrete pixel value assigned to each of the selected image band(s) 409.

After the discrete target pixel value(s) are calculated, the percent spectral tolerance 410 is used to identify or select 421 pixels in the image that contain values within a specified pixel value range. The application user interface displays a 0-100% value to enable a simple tolerance setting for user selection 410. However, the spectral tolerance may be dependent on the range of pixel values in the selected image(s) 408 and band(s) 409, so the spectral range will vary based on the user selection. Therefore, the percent spectral tolerance range of 0-100% is preferably aligned to the range of pixel values in the selected images 408. For each selected band(s) 409, the software calculates a histogram of all pixel values in the image to capture the minimum and maximum pixel value. After the histogram is calculated, one example of applying the minimum and maximum values includes applying the threshold input to a linear stretch or other contrast enhancement methods to each band(s) where, given Selected Image(s) 408, Selected Band(s) 409:

a. $409_{MIN}$=0%
b. $409_{MAX}$=100%
c. $409_{MIN-MAX}$=Stretch 1-99%

Based on the target pixel value(s) 420 and the spectral tolerance calculated, the software selects the pixel values 421 with similar values for the remainder of the image within the map view extents 415 and within the defined containment area 505.

After the desired pixels in the raster image are identified and selected 421, one option is for the software to transform pixels to vectors 422 by converting groups of raster pixels into polygons. The raw output of this transformation includes detailed polygons that precisely match the raster pixel cells, providing output with a jagged or rough appearance. Therefore, smoothing the vector lines is often preferred in order to provide a more desirable output. After transforming pixels to vectors 422, one optional process may include geometry validation in order to fix topology errors.

The calculation to smooth vectors 423 is determined by user input level of detail 411 as these parameters determine how close the smoothed geometries follow the original pixels 421. Lower values result in a closer fit to pixels and larger values result in a more general curved pattern. The calculation 423 smooths the geometries in a line or polygon layer to improve the aesthetic quality of the vector output. Smoothing algorithms include, but are not limited to, geometry generalization algorithms such as applying a Gaussian filter, Bezier curve, vertex reduction, Reumann-Witkam Algorithm, Boyle's Forward-Looking Algorithm, McMaster's Sliding or Distance Weighting Algorithm or Chaiken's Algorithm.

Additional processing with other analysis 424 includes, but is not limited to, additional object-oriented detection, machine learning, or other methods to further improve feature detection accuracy.

After pixels are transformed to vectors 422, and if a coordinate system is assigned 201, the software may calculate geometry 425 for vector coordinate values depending on the type of vector 412 defined as follows:

a. If Vector Type 412=polygon, then calculate area and perimeter.
b. If vector type 412=line, then measure distance.
c. If vector type 412=point, then calculate point count.

In some embodiments, the software may automatically extract polygons from imagery. The application 406 provides a method, an example of which is described above, for the user to choose imagery 408 and spectral band combination(s) 409, as well as a target classification type 413 as input. Classification type 413 is an example of an input parameter that may be set by the user. Examples may include, but are not limited to, areas having certain yields, areas with flood damage, plants with Nitrogen deficiency, which type(s) of fertilizer were applied, tillage practice used, etc. Inputs are then sent to the spectral selection processing system 431 for processing 419. The classification type is fed to an AI model to derive minimum and/or maximum values for the class which are then used to calculate target pixel values 420. Processing continues with the selected pixels 421.

Once processing is complete, the results are returned 426 to the user application 406, which displays results 427 to the user. One option is to allow the user to verify the results are correct 428 and, if approved, the application 406 will return validation 429 for persisted storage and use in Machine Learning (ML), Artificial Intelligence (AI) and/or other methods 430 for use in refining upcoming analysis 431. Examples of other methods used in further refining calculations could include input from environmental considerations (atmospheric conditions, soil moisture, phenological conditions, tidal conditions, etc.), additional image preprocessing, image classification, change detection, statistical accuracy assessment and image normalization (correct for atmospheric problems such as clouds or haze).

Figure 8:
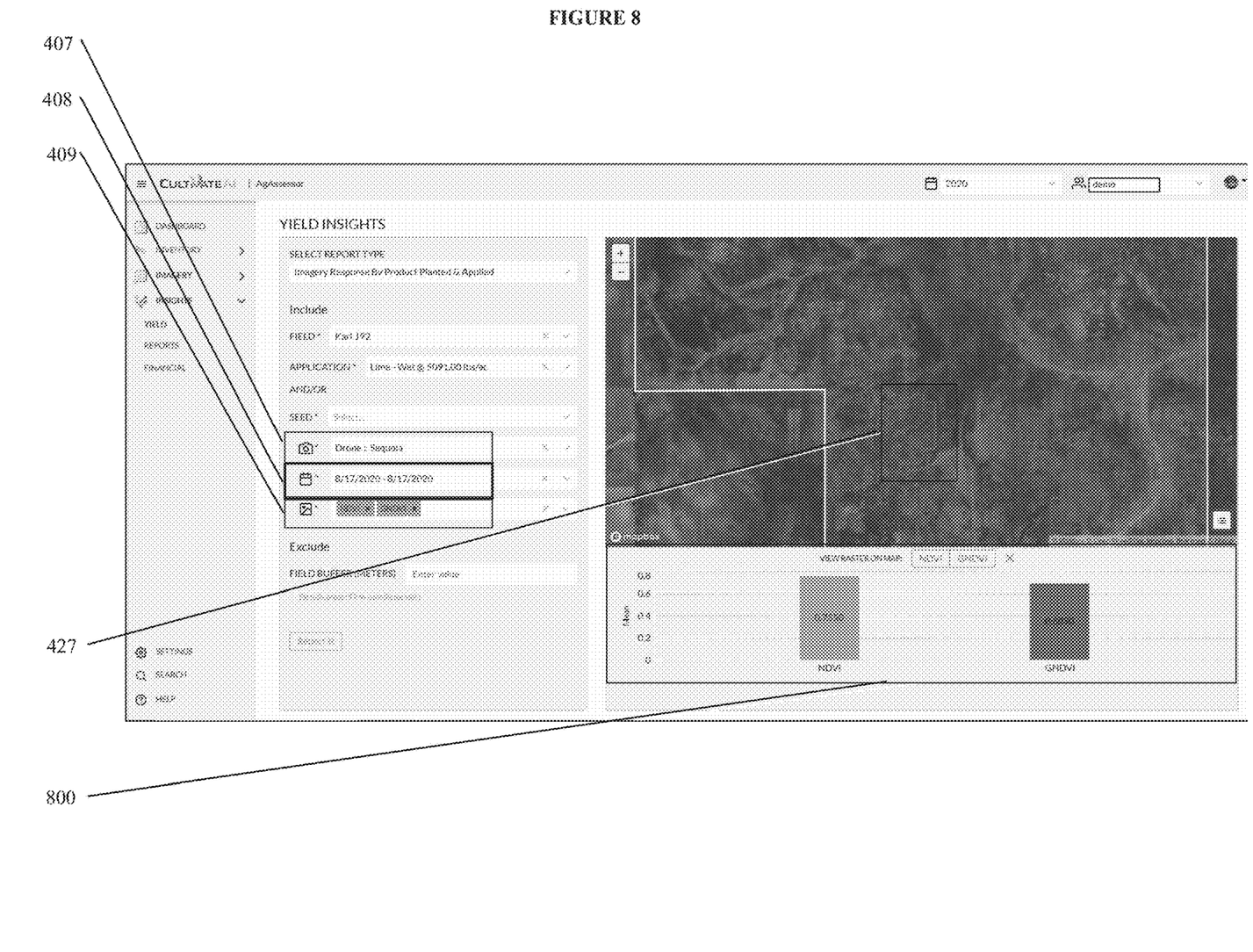
FIG. 8 shows an example of a software application user interface utilized for calculating imagery statistics in order to provide data insights within the generated vector polygon area.

The invention also provides the ability to quantify spatial patterns in imagery. For example, FIG. 8 illustrates other AI data processing 430 within the Software Application 406 "Insights" functionality. FIG. 8 focuses on the user interface but also includes a portion of the system described in FIG. 4 to show how the user interface relates to the described system. In this application, the system calculates statistics using the processed vector along with the imagery selected. This application provides the user the option to select imagery 407, image(s) 408 or image bands(s) 409, then select the vector output results 427 as the input in the insights algorithm. These inputs are sent to a cloud server 430 for processing and the results will be displayed in a Map View 414 along with a corresponding Output Chart 800 describing statistics per band combination.

FIG. 8 illustrates an example of additional data processing, or quantification, within the software application 406. Specifically, the application 406 may provide "Insights" functionality wherein the invention provides quantifies one or more parameters, such as average yield, plant count, and/or vegetation health. In other examples, quantification of imagery related to damage from a storm, flood, drought, or other issue may be provided. For example, a specific area may be measured to provide the number of acres affected, number of plants affected, or other parameters. Referring to FIG. 8, in the illustrated example of the application, the other processing 430 of the spectral selection processing 431 system utilizes user selected imagery 407, image(s) 408, image bands(s) 409, and/or the vector output results 427 as the input in the insights algorithm. These inputs are processed 430 and the results will be displayed in a map view 414 along with a corresponding output chart or graph 800 describing statistics per band combination. In the illustrated example, the provided insights are Yield Insights, which allow a user to analyze the yield in a particular field. Once the user and/or spectral selection processing 431 determines the field to be analyzed, the user may select various types of input for analysis. Examples include, but are not limited to, particular types of applications (fertilizer, pesticide, etc.) to the field, the type of seed planted, and any others known in the art now or in the future. The application 406 will then list available imagery 407 for the user to choose from. The user will select the image 408 and the image bands 409 for analysis. The spectral selection processing 431 will perform its processing and return the results 426 to the user application 406. The user application 406 will then display the results, as shown in FIG. 8.

Figure 9:
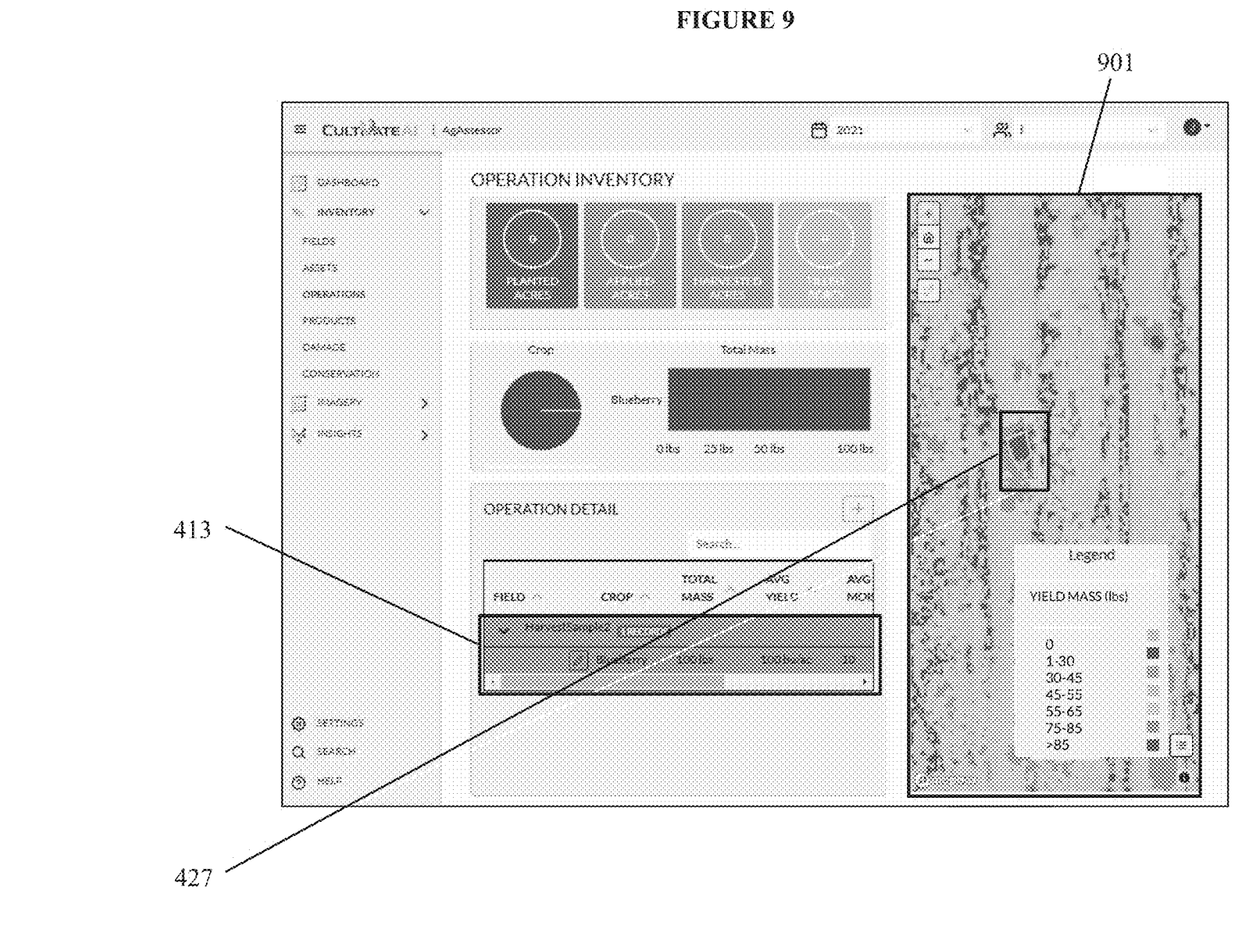
FIG. 9 shows an example of a software application user interface utilized for generating quantified output in the form of an interpolated yield map using input imagery, the vector polygon area and yield data values provided by user input.

FIG. 9 illustrates an example of additional image processing within the software application 406 yield estimation or other insights functionality. FIG. 9 focuses on the user interface but also includes a portion of the system described in FIG. 4 to show how the user interface relates to the described system. In this application, the other processing 430 utilizes other user input 413 containing the actual harvested operation yield values and the resulting vector area 427 together as a machine learning input 430. This allows a yield value corresponding to an amount of grain or other crop harvested in that other user input 413 location to be associated with the vector area 427 location. Then, the yield value is associated with the underlying raster pixel and interpolated across the remainder of the raster image based on corresponding spatial distribution, enabling the quantification and creation of an interpolated yield map during processing 430. The resulting yield map 901 is then displayed in the software application 406 to be utilized in the quantification of additional insights.

Figure 10:
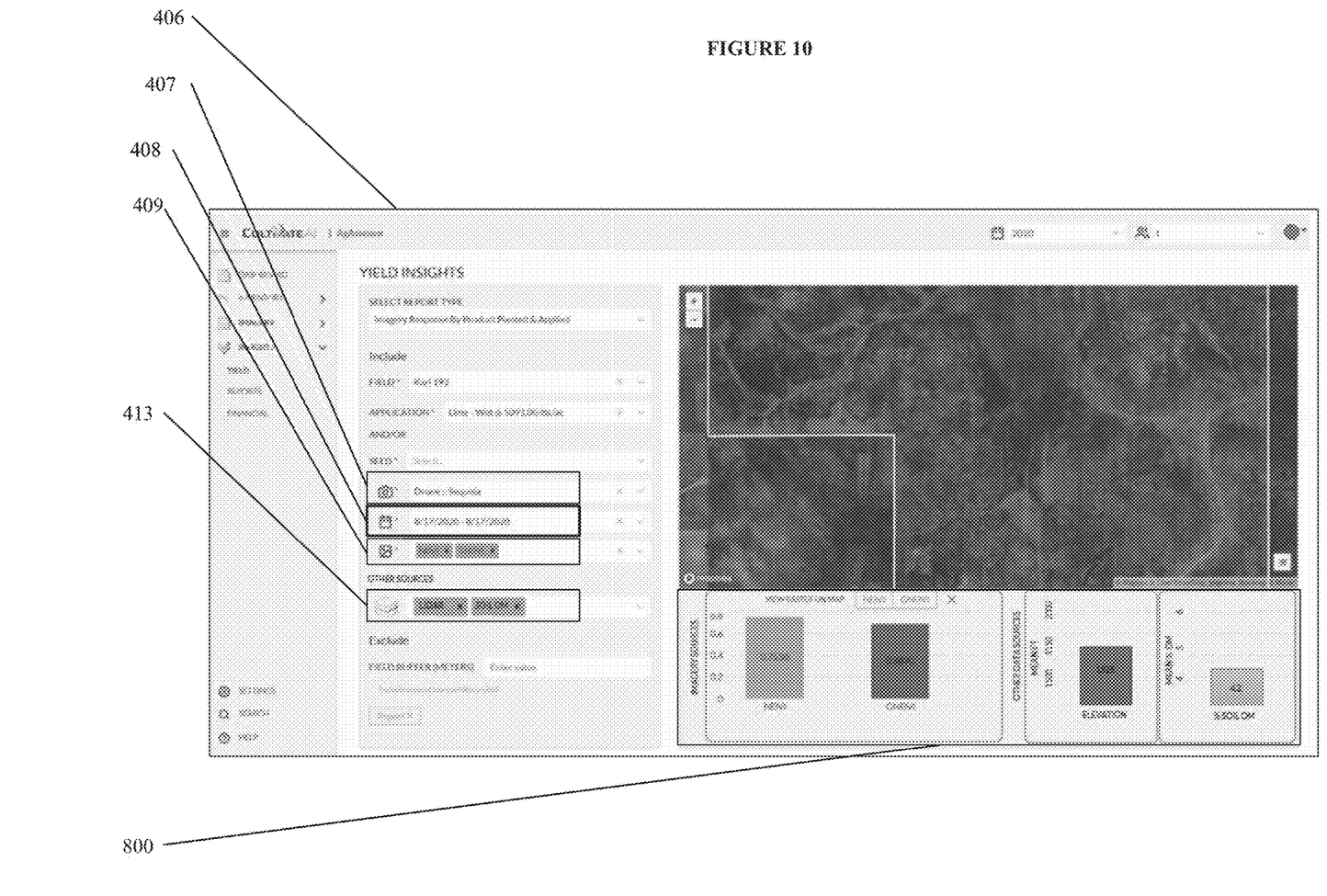
FIG. 10 shows an example of a software application user interface utilized for calculating statistics with both imagery and other data sources in order to provide insights within the generated vector polygon area.

FIG. 10 illustrates another example of additional data processing within the software application 406 insights functionality that utilizes both imagery and other data sources. FIG. 6 focuses on the user interface but also includes a portion of the system described in FIG. 4 to show how the user interface relates to the described system. In this application, the other processing 430 utilizes other user input 413 consisting of at least one LIDAR Elevation map layer and soil organic matter values as two examples of data provided from other sources 404, user selected imagery 407, image(s) 408 or image bands(s) 409 and the vector output results 427 as the input in the insights algorithm. These inputs are processed 430 and the results will be displayed in a map view 414 along with a corresponding output chart 800 describing statistics per band combination and for other raster image (ex: LIDAR) values.

Although various representative embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A system for spectral selection comprising:
   a. a spectral selection processing module including at least one processor and storing one or more pieces of imagery, said one or more pieces of imagery are raster formatted images having at least one image band, wherein said processing module is a first source of said one or more pieces of imagery;
   b. a user device module communicatively coupled to the spectral selection processing module via a communication connection, wherein said user device module is separate from said spectral selection processing module;
c. wherein the user device module and at least one processor are configured to communicate with each other and at least one non-transitory memory with one or more executable instructions stored thereon, wherein the processor is configured to execute the one or more executable instructions, wherein the one or more executable instructions are configured to cause the processor to:
i. store at least one of said one or more pieces of imagery;
ii. generate a list of said one or more pieces of imagery viewable on said user device module;
iii. generate at least one input related to said one or more pieces of imagery for user selection on said user device module;
iv. generate a map view on said user device module of said one or more pieces of imagery wherein a user may input at least one extent of said one or more pieces of imagery for analysis by said spectral selection processing module and wherein a user may input a location to generate an analysis target location;
v. receive return user input from said user device module, wherein said return user input is based on said analysis target location, said at least one extent, and said at least one input;
vi. generate target pixel values based on said return user input;
vii. transform said pixels to vectors;
viii. classify said vectors based on type of said vectors;
ix. calculate geometry corresponding to said vectors wherein said calculation varies based on the classification of said vectors;
x. return results to said user device module for display on said user device module;
d. wherein said system is implemented at least partially using cloud computing resources.

2. The system of claim 1 wherein the one or more executable instructions are also configured to cause the processor to quantify spatial patterns in said one or more pieces of imagery.

3. The system of claim 1 wherein the one or more executable instructions are also configured to cause the processor to quantify at least one parameter in said one or more pieces of imagery.

4. The system of claim 1 further comprising at least one other source of said one or more pieces of imagery.

5. The system of claim 1 wherein the one or more executable instructions are also configured to cause the processor to smooth said vectors.

6. The system of claim 1 wherein user device module input activates said processor to generate said target pixel values, which in turn activates said process to transform said pixels to vectors and calculate geometry corresponding to said vectors.

7. The system of claim 1 further including a machine learning module.

8. The system of claim 7 wherein said spectral selection processing module includes said machine learning module.

9. The system of claim 1 further including a GPS module.

10. The system of claim 9 wherein said user device modules includes said GPS module.

11. The system of claim 10 wherein said GPS module automatically inputs said location to generate said analysis target location.

12. The system of claim 1 wherein the one or more executable instructions are also configured to allow the user device module to verify said results.

13. The system of claim 12 wherein said verification is communicated to a machine learning module.

14. A system for spectral selection comprising:
a. a spectral selection processing module including at least one processor and storing one or more pieces of imagery, said one or more pieces of imagery are raster formatted images having at least one image band, wherein said processing module is a first source of said one or more pieces of imagery;
b. a user device module communicatively coupled to the spectral selection processing module via a communication connection, wherein said user device module is separate from said spectral selection processing module;
c. a GPS module communicatively coupled to at least one of said user device module and said spectral selection processing module via a communication connection wherein said GPS module generates a user input location;
d. at least one other source of said one or more pieces of imagery;
e. wherein the user device module and at least one processor are configured to communicate with each other and at least one non-transitory memory with one or more executable instructions stored thereon, wherein the processor is configured to execute the one or more executable instructions, wherein the one or more executable instructions are configured to cause the processor to:
i. store at least one of said one or more pieces of imagery;
ii. generate a list of said one or more pieces of imagery viewable on said user device module;
iii. generate at least one input related to said one or more pieces of imagery for user selection on said user device module;
iv. generate a map view on said user device module of said one or more pieces of imagery wherein a user may input at least one extent of said one or more pieces of imagery for analysis by said spectral selection processing module and wherein a user may input a location to generate an analysis target location, wherein said analysis target location may be generated by said user input location generated by said GPS device;
v. receive return user input based on said analysis target location, said at least one extent, and said at least one input;
vi. generate target pixel values based on said at least one extent return user input;
vii. transform said pixels to vectors;
viii. classify said vectors based on type of said vectors;
ix. calculate geometry corresponding to said wherein said calculation varies based on the classification of said vectors;
x. quantify spatial patterns in said one or more pieces of imagery; and
xi. quantify one or more other input data sources corresponding to said geometry;
xii. return results to said user device module for display on said user device module;

f. wherein said system is implemented at least partially using cloud computing resources.

\* \* \* \* \*